United States Patent
Feldman et al.

(10) Patent No.: US 11,694,273 B2
(45) Date of Patent: Jul. 4, 2023

(54) SYSTEM AND METHOD TO GENERATE RISK RELATIONSHIP PACKAGE USING A FLEXIBLE STRUCTURE FRAMEWORK

(71) Applicant: HARTFORD FIRE INSURANCE COMPANY, Hartford, CT (US)

(72) Inventors: Julia M. Feldman, West Hartford, CT (US); Erin M. Gibbons, Worcester, MA (US); Sandra E. Belcourt, Hamden, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 146 days.

(21) Appl. No.: 17/118,488

(22) Filed: Dec. 10, 2020

(65) Prior Publication Data

US 2022/0188936 A1    Jun. 16, 2022

(51) Int. Cl.
*G06Q 40/08* (2012.01)
*G06Q 10/10* (2023.01)
*G06Q 30/0203* (2023.01)
*G06Q 50/16* (2012.01)
*G06Q 30/0207* (2023.01)
(Continued)

(52) U.S. Cl.
CPC ............ *G06Q 40/08* (2013.01); *G06Q 10/10* (2013.01); *G06Q 30/0203* (2013.01); *G06Q 30/0222* (2013.01); *G06Q 30/0239* (2013.01); *G06Q 50/16* (2013.01); *G06Q 50/26* (2013.01); *G06F 16/252* (2019.01)

(58) Field of Classification Search
None
See application file for complete search history.

(56) References Cited

U.S. PATENT DOCUMENTS

| | | |
|---|---|---|
| 7,246,070 B2 | 7/2007 | Schwartz et al. |
| 7,451,097 B1 | 11/2008 | Faupel et al. |
| 8,175,898 B1 | 5/2012 | Lagasse et al. |

(Continued)

OTHER PUBLICATIONS

Allstate insurance assigned patent for product, coverage review, recommendation. (Jan. 4, 2020). Targeted News Service Retrieved from https://dialog.proquest.com/professional/docview/2332344243?accountid=131444 on Nov. 16, 2022 (Year: 2020).*

*Primary Examiner* — Kito R Robinson
(74) *Attorney, Agent, or Firm* — Buckley, Maschoff & Talwalkar LLC

(57) ABSTRACT

A risk relationship package data store may contain electronic records, each electronic record representing a risk relationship package between an enterprise and an entity, and including, for each package, an electronic record identifier and an overall attribute value. A computer server may transmit, to a remote device associated with the entity, a set of potential types of risk coverage based on information in an available type of risk coverage data store. The server may then receive an indication of a selected subset of the potential types of risk coverage and, based on the received indication and a pre-determined rule, generate a risk relationship package for the entity using a flexible structure framework. The server may calculate an overall attribute value for the package based on an attribute algorithm (such that at least one reduction to the overall attribute value is applied based on an amount associated with the selected subset).

19 Claims, 19 Drawing Sheets

(51) Int. Cl.
*G06Q 50/26* (2012.01)
*G06F 16/25* (2019.01)

(56) References Cited

U.S. PATENT DOCUMENTS

| | | | |
|---|---|---|---|
| 8,219,421 | B2 | 7/2012 | Schwartz et al. |
| 8,396,796 | B1* | 3/2013 | Vu .................. G06Q 40/08 |
| | | | 705/40 |
| 8,452,678 | B2 | 5/2013 | Feldman et al. |
| 8,655,686 | B2 | 2/2014 | Molinsky et al. |
| 8,775,221 | B2 | 7/2014 | Feldman et al. |
| 10,282,785 | B1 | 5/2019 | Yager et al. |
| 10,482,537 | B2 | 11/2019 | Serapin et al. |
| 2005/0108064 | A1* | 5/2005 | Castleman ............ G06Q 30/00 |
| | | | 705/4 |
| 2007/0156463 | A1* | 7/2007 | Burton .................. G06Q 40/08 |
| | | | 705/4 |
| 2010/0223078 | A1 | 9/2010 | Willis et al. |
| 2010/0274594 | A1* | 10/2010 | Virdhagriswaran ... G06Q 40/08 |
| | | | 705/4 |
| 2012/0203577 | A1 | 8/2012 | Faupel et al. |
| 2014/0324484 | A1 | 10/2014 | Feldman et al. |
| 2017/0011466 | A1 | 1/2017 | Murikipudi et al. |
| 2020/0134727 | A1* | 4/2020 | Atherton ............... G06F 40/174 |

* cited by examiner

| Anchor Coverages | Additional Option Examples | |
| --- | --- | --- |
| Water Sewer Back Up | Personal Injury | Green Rebuilding |
| Valuable Items Blanket | Disappearing Property Deductible | Unit Owners Cvg C Special Coverage |
| Build it Back Better - Roofs | RC Non-Building Structures | Supplemental Loss Assessment |
| Equipment Breakdown | Refrigerated Property | Increased Limits Business Property |
| RC Contents & Increased Limit | Golf Cart End't | |

FIG. 6

| | Coverage |
|---|---|
| Package Foundation 1 | Fire Department Service Charge increased from $500 to $1,000<br>Reward for Conviction for a Covered Fire/Theft Loss $1,000<br>Land Stabilization |
| Package Foundation 2 | Foundation 1 Coverages +<br>Contents away from Premises - Flood/EQ/Landslide<br>Property Damage Liability extension to include water damage<br>Lock Replacement for Lost/Stolen Keys |
| Package Foundation 3 | Foundation 2 Coverages +<br>Off premises Power Outage - ALE<br>Watercraft Liability increased to cover OB at 50HP<br>Watercraft Physical Damage increase up to $2,500 |

FIG. 7

Water Sewer Backup — 910

| Limit | WSB Score | Package Level | Rate |
|---|---|---|---|
| $5,000 | 0-50 | n/a | $100 |
| $5,000 | 0-50 | P1 | $75 |
| $5,000 | 0-50 | P2 | $65 |
| $5,000 | 0-50 | P3 | $60 |

Identity Fraud — 920

| Limit | Package Level | Rate |
|---|---|---|
| $25,000 | n/a | $20 |
| $50,000 | n/a | $35 |
| $25,000 | P1 | $15 |
| $50,000 | P1 | $26 |
| $25,000 | P2 | $13 |
| $50,000 | P2 | $23 |
| $25,000 | P3 | $12 |
| $50,000 | P3 | $21 |

Trust — 930

| Rate |
|---|
| $24 |

940

| Package Desc | Package Code | Coverage |
|---|---|---|
| Package 1 | P101.001 | Water Sewer Backup |
| ⋮ | ⋮ | ⋮ |
| Package 2 | P102.001 | Water Sewer Backup |
| Package 2 | P102.001 | Disappearing Prop Ded |
| ⋮ | ⋮ | ⋮ |
| Package 3 | P103.001 | Water Sewer Backup |
| Package 3 | P103.001 | Disappearing Prop Ded |
| Package 3 | P103.001 | Rep Cost Non-Building |

FIG. 9

|  | | Optional Coverages | | |
| --- | --- | --- | --- | --- |
| Identity Theft | D | Fine Arts | |
| Tree Removal | S | Trailers | O |
| Equipment Breakdown | S, D | Jewelry | |
| Student Away From Home | | Collectibles | |
| Golf Cart Coverage | O | Cyber-Bullying Liability | D |
| Sports Equipment | | Pet Injury | |

S = Suburban Home Protection Package   D = Digital Denizens   O = Outdoorsy Family

FIG. 11

SYSTEM AND METHOD TO GENERATE RISK RELATIONSHIP PACKAGE USING A FLEXIBLE STRUCTURE FRAMEWORK

TECHNICAL FIELD

The present application generally relates to computer systems and more particularly to computer systems that are adapted to accurately and/or automatically generate a risk relationship package using a flexible structure framework for an enterprise.

BACKGROUND

An entity may enter into a risk relationship with a risk relationship provider (e.g., an enterprise or insurer) to protect itself from damages associated with unexpected occurrences. For example, the risk relationship may provide payments associated with unforeseen accidents, weather events, power outages, etc. In some cases, an entity (e.g., a homeowner) may purchase from an enterprise a "package" of protections associated with different types of risk. Note, however, that package profitability and rate levels may be difficult for the enterprise to assess. Moreover, any package changes might require full rate, rule, and form filings and programming with a state Department Of Insurance ("DOI") which can be quite costly and time consuming.

It would be desirable to provide systems and methods to automatically establish a risk relationship package using a flexible structure framework in a way that provides fast and accurate results. Moreover, the package and flexible structure framework should be easy to access, understand, update, etc.

SUMMARY OF THE INVENTION

According to some embodiments, systems, methods, apparatus, computer program code and means are provided to automatically establish a risk relationship package using a flexible structure framework in a way that provides fast and accurate results and that allows for flexibility and effectiveness when creating those results.

In some embodiments, a risk relationship package data store may contain electronic records, each electronic record representing a risk relationship package between an enterprise and an entity, and including, for each package, an electronic record identifier and an overall attribute value. A computer server may transmit, to a remote device associated with the entity, a set of potential types of risk coverage based on information in an available type of risk coverage data store. The computer server may then receive an indication of a selected subset of the potential types of risk coverage and, based on the received indication and a pre-determined rule, generate a risk relationship package for the entity using a flexible structure framework. The computer server may calculate an overall attribute value for the package based on an attribute algorithm (such that at least one reduction to the overall attribute value is applied based on an amount associated with the selected subset) and create a new electronic record in the risk relationship package data store, including the calculated overall attribute value.

Some embodiments comprise: means for accessing, by the back-end application computer server, a risk relationship package data store that contains electronic records, each electronic record representing a risk relationship package between an enterprise and an entity, and including, for each risk relationship package, an electronic record identifier and an overall attribute value; means for transmitting, from the back-end application computer server to a remote device associated with the entity, a set of potential types of risk coverage based on information in an available type of risk coverage data store; means for receiving, from the remote device, an indication of a selected subset of the potential types of risk coverage; based on the received indication and a pre-determined rule, means for generating a risk relationship package for the entity using a flexible structure framework; means for calculating an overall attribute value for the generated risk relationship package based on an attribute algorithm such that at least one reduction to the overall attribute value is applied based on an amount associated with the selected subset; and means for creating a new electronic record in the risk relationship package data store, including the calculated overall attribute value.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to automatically generate a risk relationship package in a way that provides fast and accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 illustrates another flexible structure framework for coverage packages according to some embodiments.

FIG. 7 illustrates package coverage foundation endorsements in accordance with some embodiments.

FIG. 9 is a structure design in accordance with some embodiments.

FIG. 11 shows coverage configuration versions in accordance with some embodiments.

DETAILED DESCRIPTION

Figure 1:
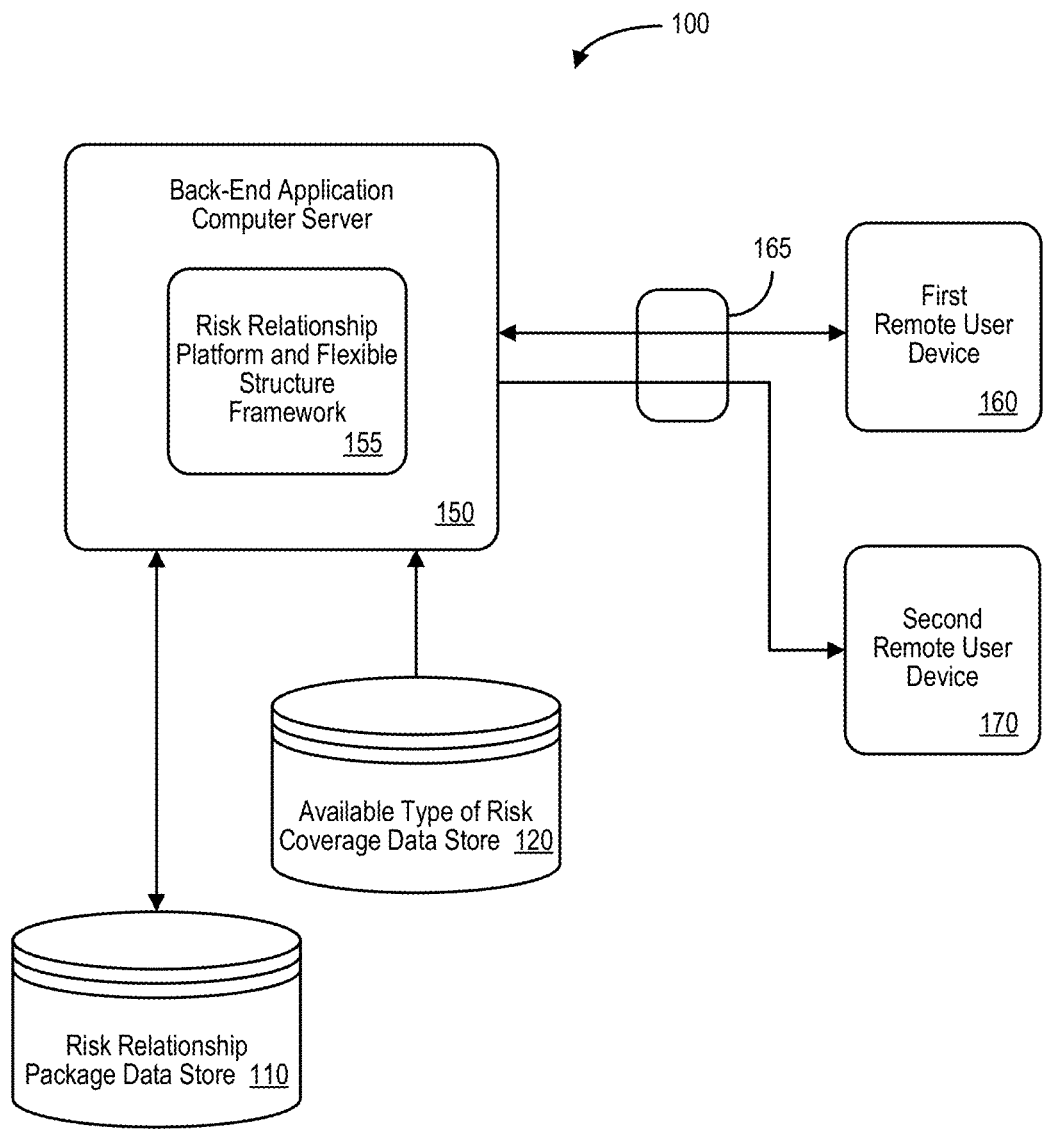
FIG. 1 is a high-level block diagram of a system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate the generation of risk relationship packages using a flexible structure framework. The present invention is directed to more than merely a computer implementation of a routine or conventional activity previously known in the industry as it provides a specific advancement in the area of electronic record analysis by providing improvements in data leveraging to generate risk relationship packages using a flexible structure framework. The present invention provides improvement beyond a mere generic computer implementation as it involves the novel ordered combination of system elements and processes to provide improvements in data leveraging to generate the package, calculate an overall attribute value, etc. Some embodiments of the present invention are directed to a system adapted to automatically analyze insurance data, aggregate data from multiple sources, automatically identify personas, automatically identify how these personas drive selections, and/or automatically generate risk relationship packages. Moreover, communication links and messages may be automatically established, aggregated, formatted, etc. to improve network performance and/or bandwidth based on the package and a flexible structure framework (e.g., to streamline a workflow associated with a package). Moreover, the maintenance of the computer systems, databases, etc. may be simplified as a result of embodiments described herein.

Embodiments may provide a flexible structure framework and an active monitoring approach to let an enterprise more effectively leverage package options and improve business results. FIG. 1 is a high-level block diagram of a system 100 according to some embodiments of the present invention. In particular, the system 100 includes a back-end application computer server 150 that may access information in a risk relationship package data store 110 (e.g., storing a set of electronic records that represent risk associations, each record including, for example, one or more risk relationship package identifiers, an overall attribute value, etc.). The back-end application computer server 150 may also retrieve information from other data stores or sources, such as an available type of risk coverage data store 120, in connection with a risk relationship platform and flexible structure framework 155 to view, analyze, and/or update the electronic records. The back-end application computer server 150 may also exchange information with a first remote user device 160 and a second remote user device 170 (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about an existing risk relationship package) and/or the remote user devices 160, 170. For example, the first remote user device 160 may transmit annotated and/or updated information to the back-end application computer server 150. Based on the updated information, the back-end application computer server 150 may adjust data in the risk relationship package data store 110 and the change may be viewable via a generic second remote user device 170. Note that the back-end application computer server 150 and/or any of the other devices and methods described herein might be associated with a third-party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the risk relationship package data store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the risk relationship package data store 110 and/or available type of risk coverage data store 120. The data stores 110, 120 may be locally stored or reside remote from the back-end application computer server 150. As will be described further below, the risk relationship package data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and risk relationship package data store 110 might be co-located and/or may comprise a single apparatus.

In some embodiments, the system 100 may be adapted over time to optimize take rates, targeting various consumer segments. Moreover, package profitability may be managed at the coverage level and package coverage composition changes may require little or no DOI filings. With a flexible structure bundling individual optional coverages, ratings may be done at individual optional coverage level and package discount levels may vary by optional coverages.

Some embodiments may be associated with fewer coverages and certain popular coverages might be included in all packages. As the number of coverages increase, the limits may largely stay the same. A consumer-centric design (as opposed to one centered on an insurance provider) might, for example, have three tiers or levels of protection to target three buying segments with an ability to expand to additional target consumer groups. A buying segment identifier may allow for active monitoring and adaptation and the flexible structure may reduce cost barriers to in-market test and learn, adaptation, and expansion. Evolution leveraging this flexibility may support Point Of Sale ("POS") customization provide a differentiated experience for consumers. Speed to market may be improved as a result of a limited need for programming and/or filing. Moreover, customization at the POS may provide relatively fast and accurate offerings in terms of pricing for the consumer or business customer.

Figure 2:
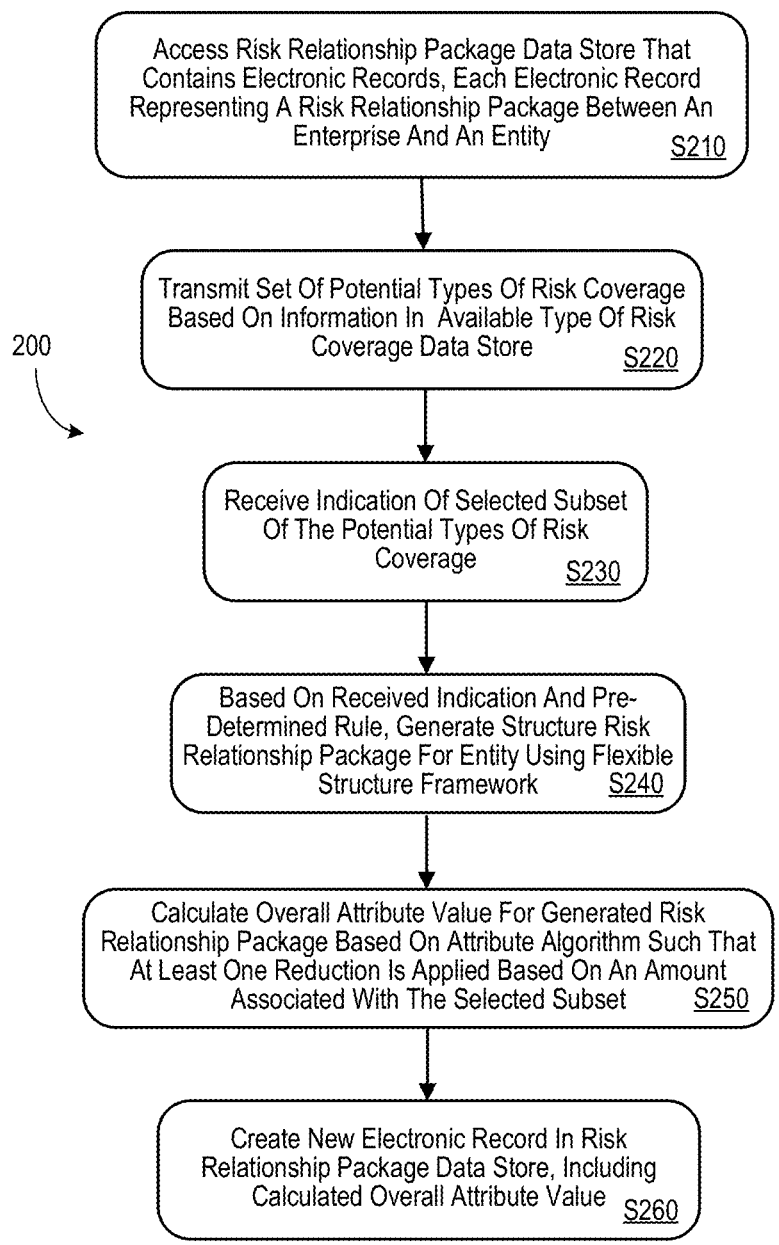
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may access a risk relationship package data store that contains electronic records, each electronic record representing a risk relationship package between an enterprise and an entity (e.g., a homeowner), and including, for each risk relationship package, an electronic record identifier and an overall attribute value. At S220, the back-end application computer server may transmit to a remote device, associated with an entity, a set of potential types of risk coverage based on information in an available type of risk coverage data store. The set of potential types of risk coverage might include, for example, a fire department service charge, lock replacement, water sewer backup, equipment breakdown, roof damage, weather damage, property damage, personal injury, etc.

At S230, the system may receive, from the remote device, an indication of a selected subset of the potential types of risk coverage. Based on the received indication and a pre-determined rule, at S240 the system may generate a risk relationship package for the entity using a flexible structure framework (e.g., as described in connection with FIGS. 4 through 12). The risk relationship package may include, in some embodiments, pre-grouped types of risk coverage in addition to the selected subset of the potential types of risk coverage received from the user device. The pre-grouped types of risk coverage may be, for example, associated with at least three coverage tiers. In this case, the back-end application computer server might automatically suggest one of the coverage tiers for the entity (e.g., as being most appropriate for the entity). The automatic suggestion of one of the coverage tiers might be based on, at least in part, answers provided by the entity to a series of questions.

Figure 8:
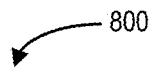
FIG. 8 shows some structure options according to some embodiments.

At S250, an overall attribute value may be calculated for the generated risk relationship package based on an attribute algorithm such that at least one reduction to the overall attribute value is applied based on an amount associated with the selected subset (e.g., a volume premium discount in accordance with any of the techniques described with respect to FIG. 8). The attribute algorithm might apply, for example: a flat package discount; a package volume discount; a package volume discount with an eligibility component; a package discount at coverage level; etc. At S260, a new electronic record may be created in the risk relationship package data store, including the calculated overall attribute value. In some embodiments, the generated risk relationship package is associated with a homeowner's insurance policy and the calculated overall attribute value is an insurance premium value.

In this way, embodiments may deliver newly configured packages, enabling consumers to select an optional bundle that meets their needs within a structure that supports ongoing evolution of the offering to optimize impact. Note that such insurance packages might be provided for consumer products and/or business insurance products. The coverage packages may be organized around impactful, popular coverages based on consumer research and be offered at three price points to meet the needs of a range of insureds. All coverages in coverage packages might also be available for purchase as individual endorsements. The package price may then be discounted from the cost of purchasing the coverages separately.

Figure 3:
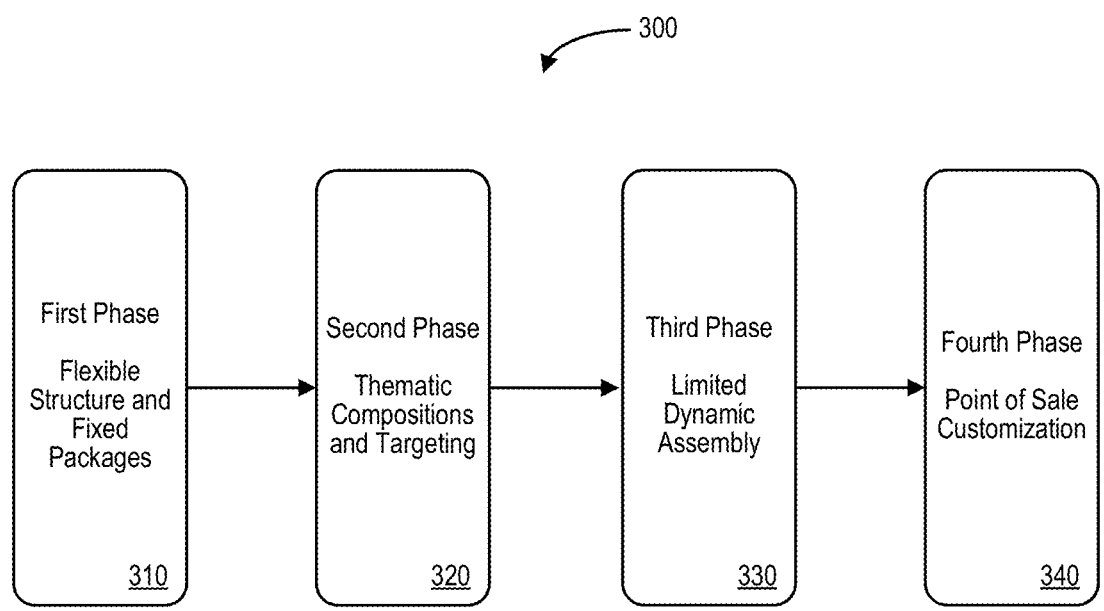
FIG. 3 is one possible homeowners insurance package evolution in accordance with some embodiments.

FIG. 3 is one possible homeowners insurance package evolution 300 in accordance with some embodiments. In a first phase 310, a flexible structure framework and fixed packages may use a package rule and base endorsements. For example, three package levels might be provided (based on a number of included optional coverages) and be rated at an optional coverage level. Eligible optional coverages may be provided with stand-alone and/or package rates for each package level. The information may be presented to consumers in a side-by-side display showing the three packages on a quote premium screen. The price displayed might represent an incremental cost, total quote premium including the package, etc.

In a second phase 320, thematic compositions and targeting may be provided with the introduction of additional version codes and package rates may be adjusted based on experience and learnings. A side-by-side display may be provided based on consumer targeting and the system might automatically highlight a targeted package. Additional defined package offerings with thematic composition may be added to the three original levels to target consumers based on buying segment and theme identifiers.

In a third phase 330, limited dynamic assembly may be provided with the introduction of dynamic version code assignments. Package rates may be adjusted based on experience and learnings and be presented side-by-side with the dynamically assembled package being shown first. The system may display a buying segment target package second and a thematic target package third. In some embodiments, the number of packages for side-by-side display may be reduced and optional coverage inclusions may be based on insured/property characteristics, quote flow questions, etc.

In a fourth phase 340, POS customization may be provided with the introduction of a custom package level, version codes, and rules. A direct custom selection screen and agency preference selection screen may provide a side-by-side display on quote premium screen of custom package and one other targeted package. The composition may be based upon custom selections of quote or agency preferences.

Figure 4:
FIG. 4 illustrates coverage compositions for homeowners insurance coverage packages according to some embodiments.

Various coverage selections might be included in consumer research to determine packages and/or prices. For example, FIG. 4 illustrates 400 coverage compositions for homeowners insurance coverage packages according to some embodiments. As shown in FIG. 4, coverages shown in "bold" typeface represent popular coverages. Three levels may provide customize protection associated with: price sensitive, value buying, and protection oriented customers (targeting three buying segments). In some embodiments, unique condominium owner and/or tenant packages may also be provided.

Figure 5:
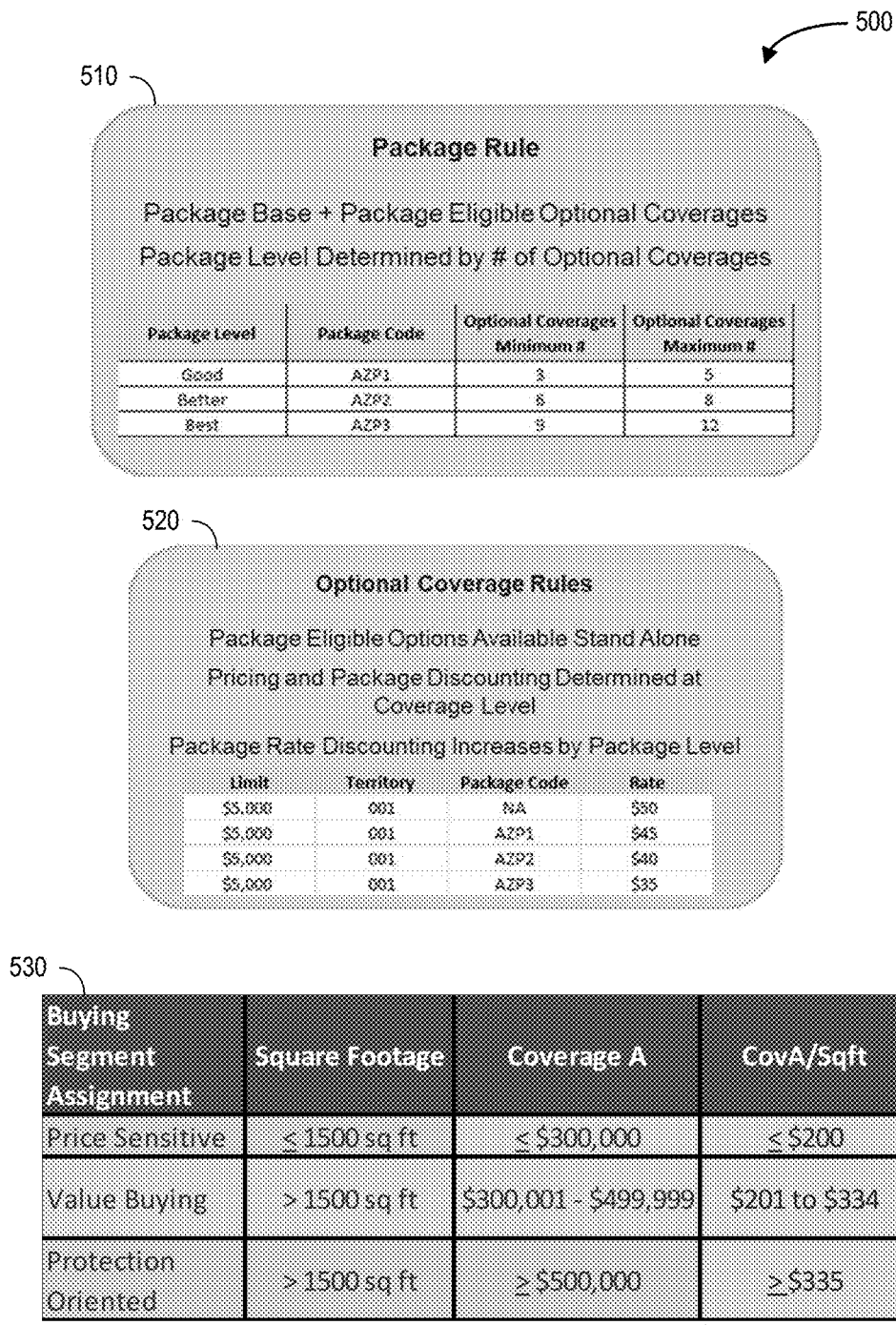
FIG. 5 illustrates a flexible structure framework for various pre-defined packages in accordance with some embodiments.

FIG. 5 illustrates 500 a flexible structure framework for various pre-defined packages in accordance with some embodiments. In particular, package rules 510, optional coverage rules 520, and a buying segment identifier 530 may be provided. The package level may be determined based upon the number of coverages within the package. Package rates may be included in the optional coverage rule 520 and may decrease as the package level increases. Versioning may enable varying coverage configurations and testing those configurations in the insurance market over a period of time.

In some embodiments, the system may establish a package base of coverages unavailable outside the package to prevent self-selection at POS. For example, FIG. 6 illustrates package eligible optional or "additional" coverages 600 associated with a flexible structure framework according to some embodiments. These may represent a subset of optional coverages and be associated with an expandable portfolio. Moreover, the system may manage package discounting at the coverage level provides maximum flexibility for profitability management.

In some embodiments, package foundation endorsements may include coverages otherwise unavailable. Each base may build on a prior base and provide a greater number of coverages. For example, FIG. 7 illustrates package coverage foundation endorsements 700 for three levels in accordance with some embodiments. Note that package foundation endorsements may provide additional margin and/or avoid system design complexity associated with optional coverage selection in transactions. Package foundation endorsements may also mitigate against adverse selection via unmanaged self-selection at POS and/or eliminate expenses associated with creating, pricing, and programming additional new endorsements.

Package premiums may be calculated by summing individual premiums for each included coverage. Premiums may vary by package level with embedded discounting based on the number of eligible coverages and coverage type. This approach may provide an enterprise with pricing flexibility while reducing programming requirements. FIG. 8 shows some structure options 800 according to some embodiments. Option 1 sums the premiums associated with the individual coverages and applies a flat package discount:

(Cov 1+Cov 2+Cov 3)*(Flat Package Discount)

Such an approach may make it easy to understand the bundle discount and to modify coverages within a package. However, this option may not provide an ability to vary discount by coverage component or to vary discount by number of coverages.

Option 2 sums the premiums associated with the individual coverages and applies a discount that varies based on the package:

(Cov 1+Cov 2+Cov 3)*(Package A Discount Level)

This approach may also make it easy to understand the bundle discount and to modify coverages within a package. It may also provide an ability to vary the discount by package. However, it still might not provide an ability to vary the discount by coverage component.

Option 3 applies the package discount, which varies by the number of eligible coverages, to each eligible coverage. It sums these premiums and add the premiums for coverages that are ineligible for the discount:

(Cov 1+Cov 2)*(2 Eligible Coverage Discount Level)+Cov 3

Again, this approach makes it easy to understand the bundle discount and to modify coverages w/in a package. This structure for a variable package discount provides greater flexibility (but there is still no ability to vary discount by coverage component).

Option 4 sums the premiums associated with the individual coverages, each of which vary based on whether the coverages were purchased standalone or via a package. The coverage package rate varies by package:

(Cov 1 Pkg A Rate+Cov 2 Pkg A Rate+Cov 3 Pkg A Rate)

With this approach, premiums are captured at the coverage level and there is an ability to vary the discount and price at the coverage level providing optimal pricing flexibility. It may also provide an ability to vary the discount by package.

According to some embodiments, the system may assign an appropriate package code to each quote/policy. This code may be used to attach forms and apply package pricing for coverages included in the selected package. Rate tables for all package eligible coverages may include package pricing to increase speed to market as package compositions are modified over time. For example, FIG. 9 is a structure design 900 in accordance with some embodiments. The design 900 includes a water sewer backup table 910, identify fraud table 920, and trust 930 associated with a rate engine along with a reference table 940.

In some embodiments, the system may assign a package level code based on the selected package. This code (e.g., "P1") may then be used as part of the key to determine the appropriate rate. Structuring rate tables by package level for a subset of coverages (and not as part of one of the pre-defined packages) may increase speed to market if/when the composition of the packages is changed (pending DOI approval of the rates and package rules). The reference table 940 may define each of the coverages within the various packages and dictate which coverages will be displayed when the packages are presented to a consumer. The reference table 940 may also ensure that customers who select a package will not receive a package discount on coverages that are not currently offered via the packages.

Figure 10:
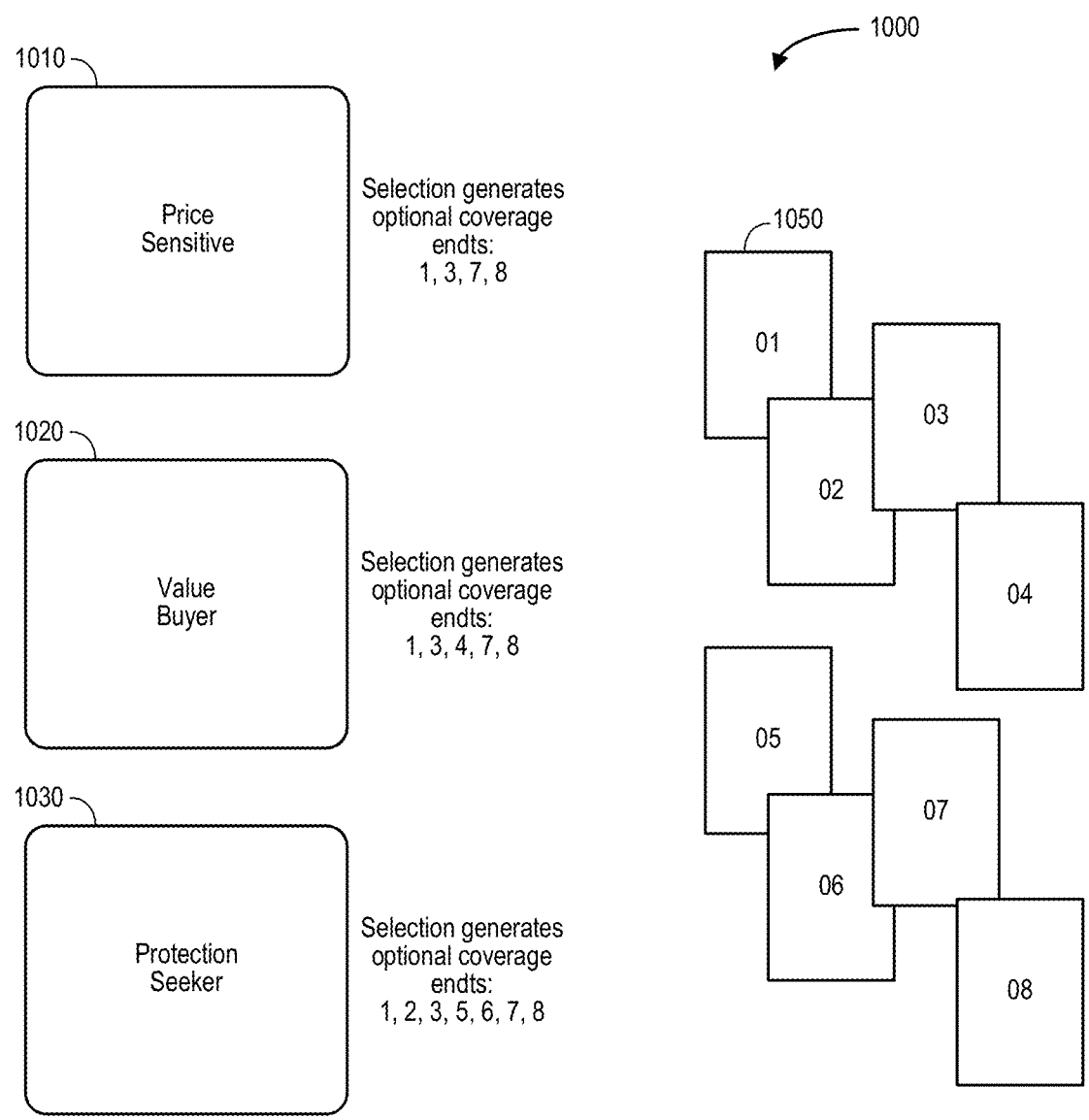
FIG. 10 illustrates a version and filing approach according to some embodiments.

Insurance packages might not have a static form, but instead utilize a "flexible structure framework" associated with individually available optional coverages. This may enable modifications to coverage configurations over time to optimize take rate, profitability, etc. For example, FIG. 10 illustrates a version and filing approach 1000 for a price sensitive package 1010, a value buyer package 1020, and a protection seeker package 1030 (with three different price points discounted as compared to individually purchased insurance to target three customer buying segments). Optional coverage endorsements 1050 may also be provided to be available individually and pre-set bundles may be included in option packages. Selected endorsements 1050 may be brought into the appropriate package 1010, 1020, 1030 and "shrink wrapped" to be delivered as an insurance package for a homeowner. According to some embodiments, individual coverage endorsements may be filed with a DOI along with a pricing table (e.g., $X as a standalone, $Y as part of a price sensitive package, etc.).

Defining packages based upon number of coverages pulled from a defined pool of eligible options may provide flexibility to change coverage composition with minimal filing and programming. This can create an in-market testing capability resulting in different package compositions by state or over time. Neighbors purchasing the same level package may have different coverages within it. Version codes may be utilized to identify varying compositions within the same volume-based package level (letting an enterprise monitor the different coverage compositions).

Some embodiments may support the development of additional packages targeting buyers from a perspective that is intuitive to consumers and resonates emotionally with how they identify their priorities or lifestyles. For example, FIG. 11 shows coverage configuration versions 1100 associated with a suburban home protection package, digital denizens, outdoorsy family, etc. Embodiments may support a degree of POS customization by letting consumers select their own coverage options for inclusion in an individualized package. Consumers may select a price-point and be provided a choice of a specified number of options from designated available coverages at set limit levels.

Figure 12:
FIG. 12 is a filing approach for coverage packages according to some embodiments.

An initial filing may avoid defining packages coverage compositions to maximize an enterprise's ability to quickly implement changes as it monitors package take rate and profitability. Some state DOI may require more details, a filing strategy may include options to preserve as much flexibility and speed to market capability as possible. For example, FIG. 12 is a filing approach 1200 for coverage packages according to some embodiments. Option 1 uses file rates and rules that provide for the most flexibility to modify package composition as the enterprises tests and learns. No specific coverages compositions might be listed in the rule and all packages may include a package base which is only available in a package. In addition to the package base, other eligible coverages may be included in the packages. In some embodiments, a package level is determined based on the number of eligible coverages in the package. The minimum number of optional coverages required to constitute the various package levels may be specified, and rates may be discounted based on the package level (e.g., the number of coverages) and/or coverage type Option 2 may file package eligible options to provide some flexibility as we modify package composition. In this case, eligible coverages may be listed in the rule. Option 3 may file pre-defined package compositions and the corresponding rates. In this case, coverage compositions may be defined in the rule. Moreover, a fall back may be provided to file coverages with package level rates only for those coverages included in the pre-defined packages.

Figure 13:
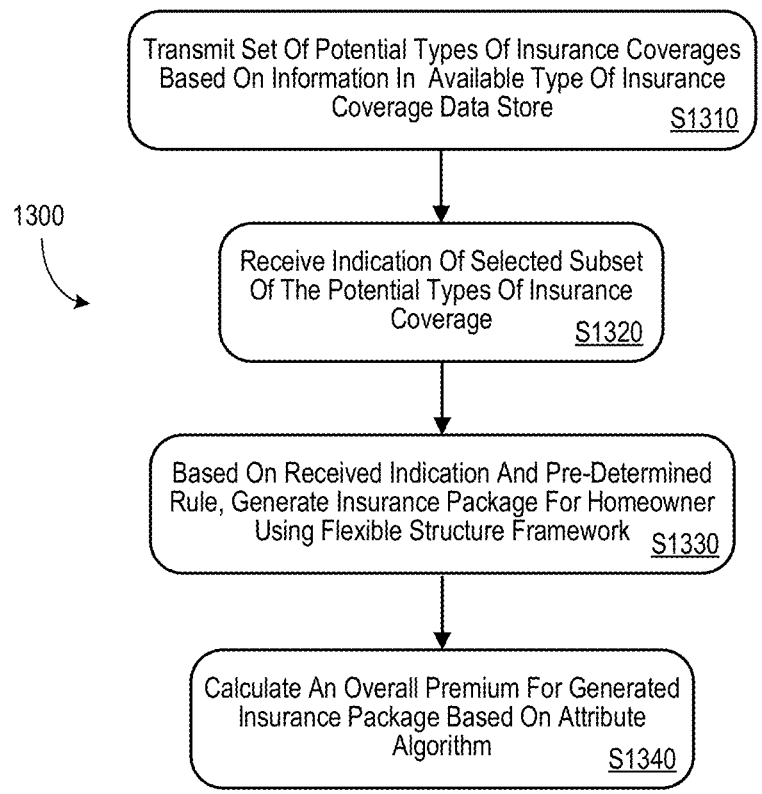
FIG. 13 is a package creation method in accordance with some embodiments.

FIG. 13 is a package creation method 1300 in accordance with some embodiments. At S1310, the system may transmit a set of potential types of insurance coverages based on information stored in an available type of insurance coverage data store (e.g., by transmitting the information to a homeowner). The system may then receive an indication of selected subset of the potential types of insurance coverage at S1320 and, based on the received indication and predetermined rule, generate an insurance package for the homeowner using a flexible structure framework at S1330. At S1340, the system may automatically calculate an overall premium for the generated insurance package based on an attribute algorithm such that at least one reduction to the overall attribute value is applied based on an amount associated with the selected subset.

Figure 14:
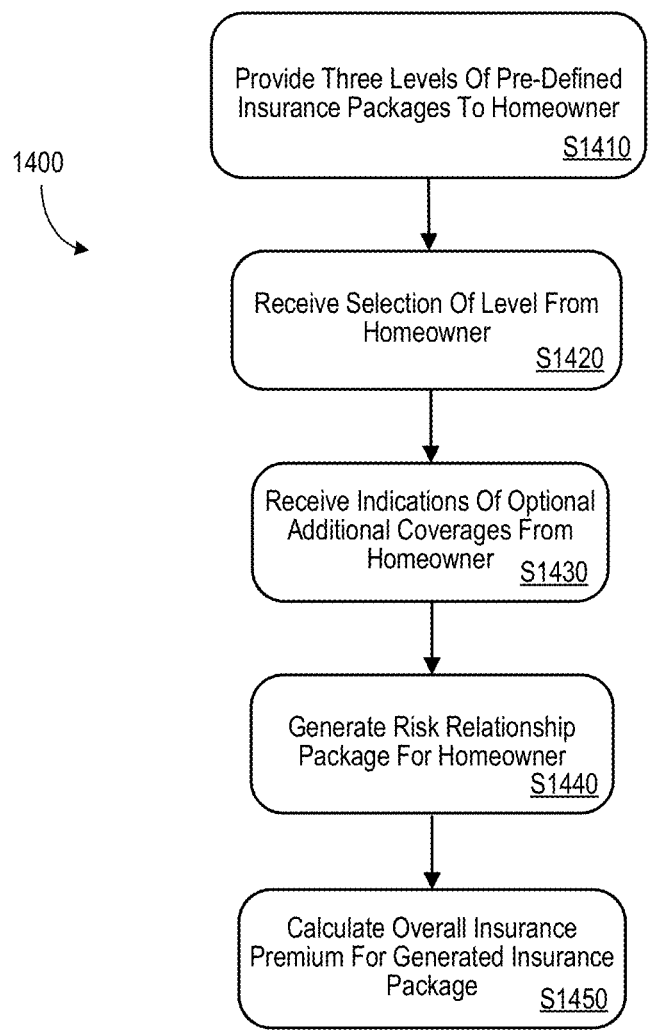
FIG. 14 is method associated with protection tiers or levels according to some embodiments.

FIG. 14 is method 1400 associated with protection tiers or levels according to some embodiments. At S1410, the system may provide three levels of pre-defined insurance packages to a homeowner (e.g., representing coverages that are popular with consumers). The system may then receive from the homeowner a selection of one of those levels at S1420. The system may also receive indications of optional additional coverages from the homeowner at S1430 and automatically generate a risk relationship package for the homeowner at S1440 using a flexible structure framework. The system may then calculate an overall insurance premium for the newly generated insurance package at S1450.

Figure 15:
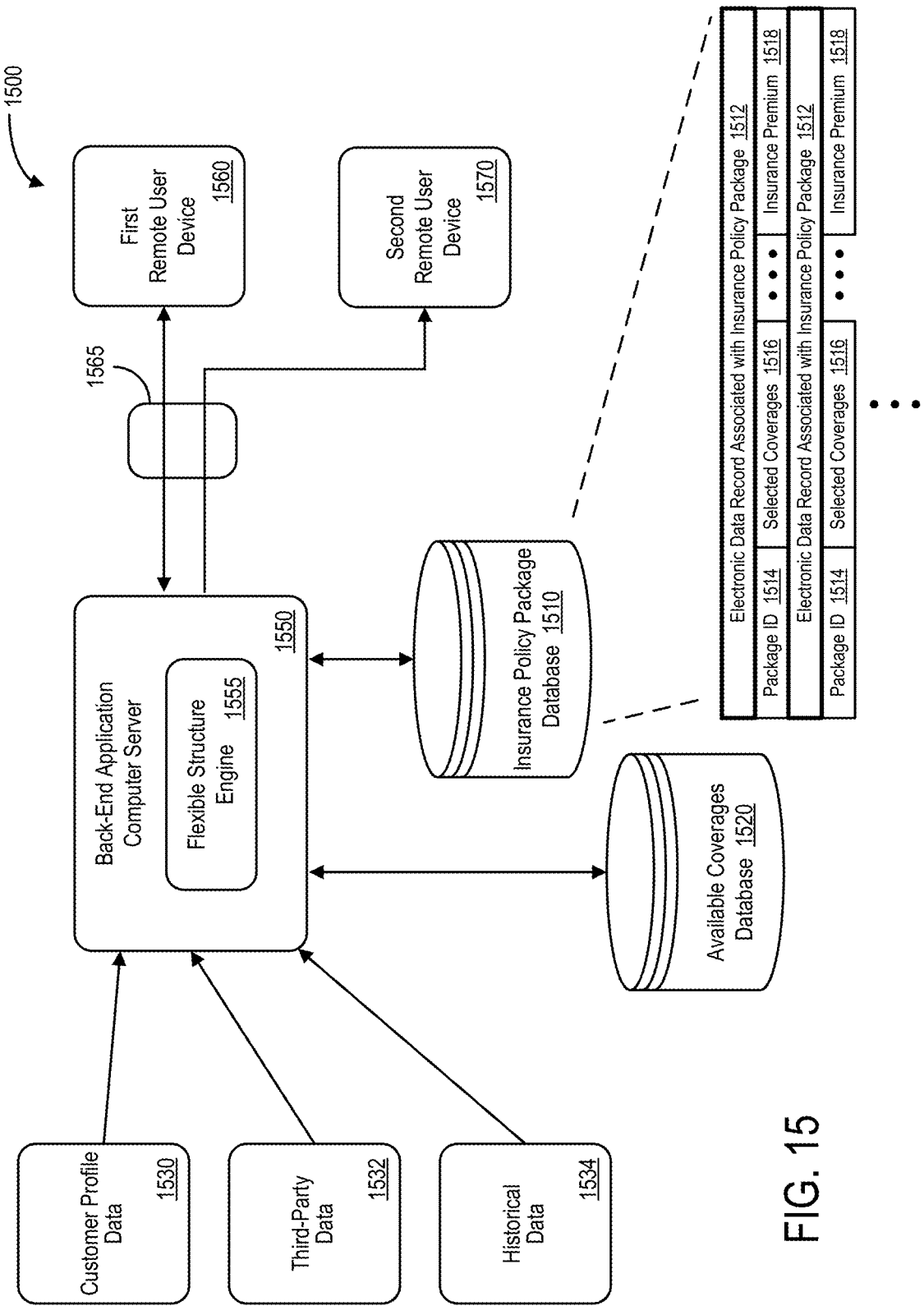
FIG. 15 is a more detailed block diagram of a system according to some embodiments.

FIG. 15 is a more detailed block diagram of a system 1500 according to some embodiments. Here, a back-end application computer server 1550 uses a flexible structure engine 1555 (e.g., associated with Artificial Intelligence ("AI"), Machine Learning ("ML"), or a predictive model) to analyze information in an insurance policy package database 1510. The insurance policy package database 1510 may contain, for example, electronic data records 1512 containing an insurance policy package identifier 1514, selected insurance coverages 1516, insurance premium values 1518, etc. The flexible structure engine 1555 may also receive information from an available coverages database 1520 (e.g., associated with different types of risks), customer profile data 1530, third-party data 1532, and historical data 1534. Moreover, the back-end application computer server 1550 may exchange information (e.g., via a firewall 1565) with multiple remote user devices 1560, 1570 (e.g., such as those associated with customers, homeowners, agents, administrators, etc.).

Figure 16:
FIG. 16 illustrates a question display that may be used to code respondents into preliminary persona categories in accordance with some embodiments.

In some embodiments, the customer profile data 1530 may be used to identify a persona profile that describes a homeowner (and that persona might be used to suggest an appropriate package level, optional coverages that might be of interest, etc.). FIG. 16 illustrates a questions display 1600 that may be used to code respondents into preliminary persona categories in accordance with some embodiments. The questions display 1600 might include an interactive user interface area 1610 that the homeowner can use (e.g., via a touchscreen or computer mouse pointer 1690) to select answers to various questions. Selection of a "Submit" icon 1620 may cause those answers to be transmitted to the enterprise.

Figure 17:
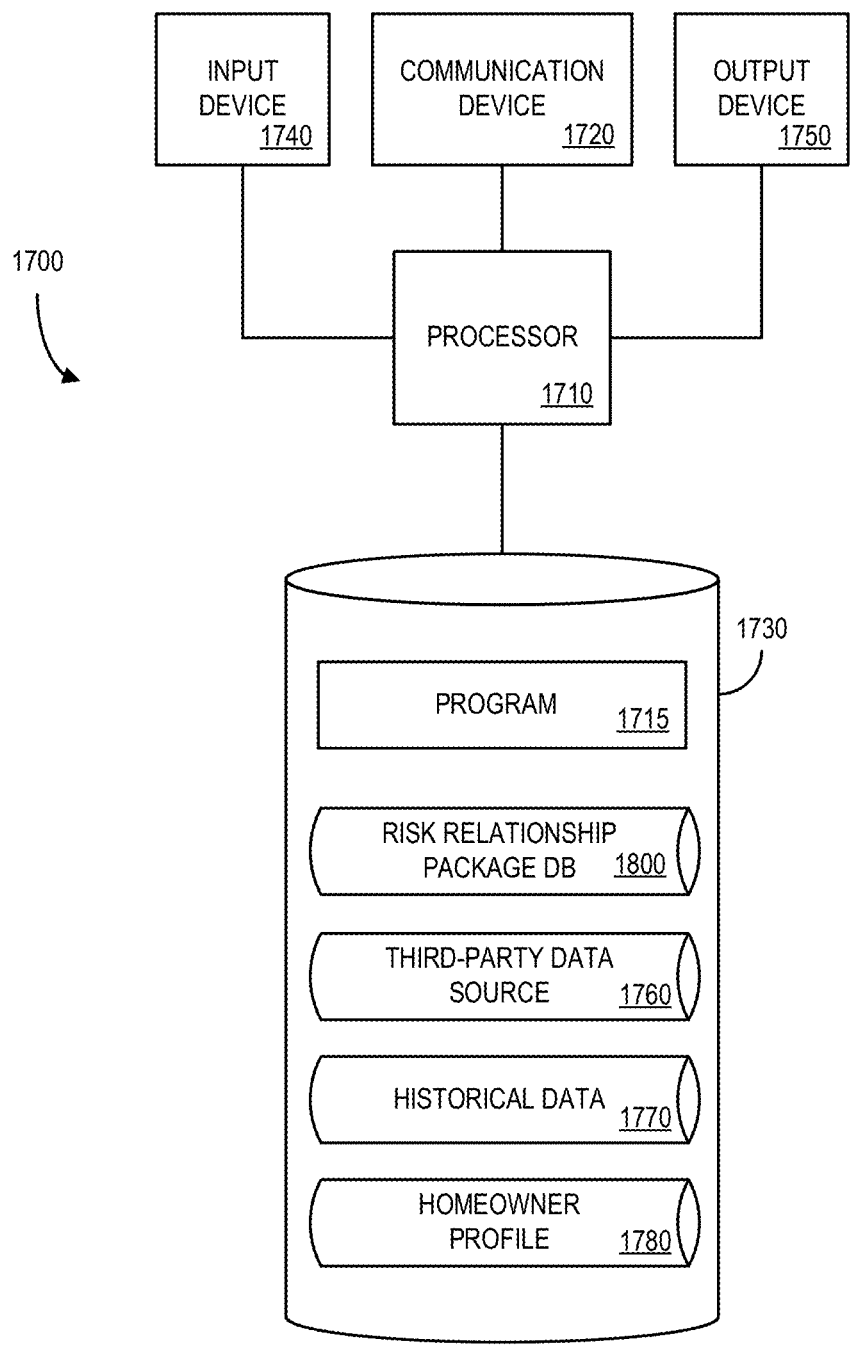
FIG. 17 is a block diagram of an apparatus in accordance with some embodiments of the present invention.

The embodiments described herein may be implemented using any number of different hardware configurations. For example, FIG. 17 illustrates an apparatus 1700 that may be, for example, associated with the systems 100, 1500 described with respect to FIGS. 1 and 15, respectively. The apparatus 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote third-party information suppliers, administrator computers, and or communication devices (e.g., PCs and smartphones). Note that communications exchanged via the communication device 1720 may utilize security features, such as those between a public internet user and an internal network of an insurance company and/or an enterprise. The security features might be associated with, for example, web servers, firewalls, and/or PCI infrastructure. The apparatus 1700 further includes an input device 1740 (e.g., a mouse and/or keyboard to enter information about package options, third parties, etc.) and an output device 1750 (e.g., to output reports regarding packages, recommended changes, etc.).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1715 and/or insurance package tool or application for controlling the processor 1710. The processor 1710 performs instructions of the program 1715, and thereby operates in accordance with any of the embodiments described herein. For example, the processor 1710 may transmit, to a remote device associated with an entity (e.g., a homeowner), a set of potential types of risk coverage based on information in an available type of risk coverage data store. The processor 1710 may then receive an indication of a selected subset of the potential types of risk coverage and, based on the received indication and a pre-determined rule, generate a risk relationship package for the entity using a flexible structure framework. The processor 1710 may calculate an overall attribute value for the package based on an attribute algorithm (such that at least one reduction to the overall attribute value is applied based on an amount associated with the selected subset) and create a new electronic record in the risk relationship package data store, including the calculated overall attribute value.

The program 1715 may be stored in a compressed, uncompiled and/or encrypted format. The program 1715 may furthermore include other program elements, such as an operating system, a database management system, and/or device drivers used by the processor 1710 to interface with peripheral devices.

As used herein, information may be "received" by or "transmitted" to, for example: (i) the back-end application computer server 1700 from another device; or (ii) a software application or module within the back-end application computer server 1700 from another software application, module, or any other source.

In some embodiments (such as shown in FIG. 17), the storage device 1730 further stores a risk relationship package database 1800, a third-party data source 1760 (e.g., associated with someone other than the insured and the insurer), historical data 1770 (e.g., past answers from homeowners and what packages they ended up selecting), and a homeowner profile 1780. An example of a database that might be used in connection with the apparatus 1700 will now be described in detail with respect to FIG. 18. Note that the database described herein is only an example, and additional and/or different information may be stored therein. Moreover, various databases might be split or combined in accordance with any of the embodiments described herein. For example, the risk relationship package database 1800 and third-party data source 1760 might be combined and/or linked to each other within the program 1715.

Figure 18:
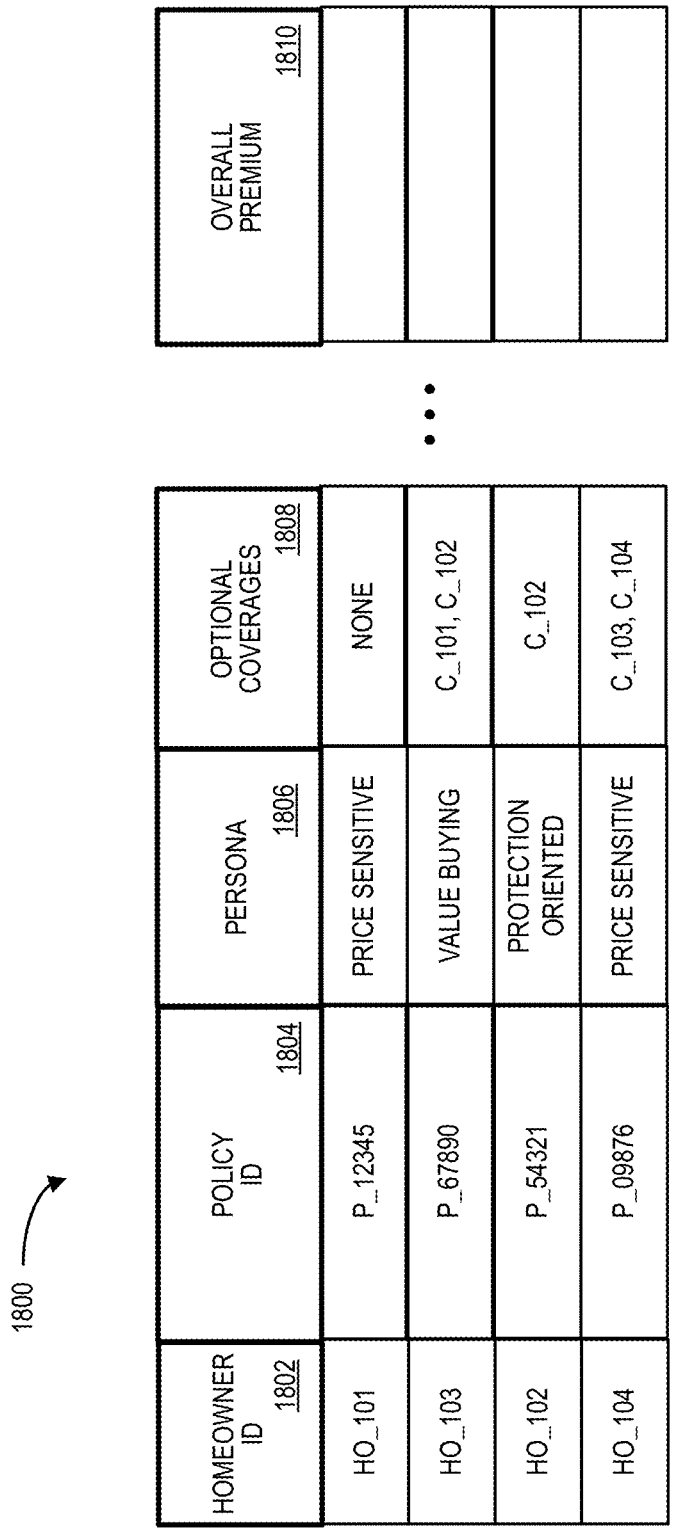
FIG. 18 is a portion of a tabular risk relationship package database according to some embodiments.

Referring to FIG. 18, a table is shown that represents the risk relationship package database 1800 that may be stored at the apparatus 1800 according to some embodiments. The table may include, for example, entries associated with insurance policy packages that have been generated by an enterprise using a flexible structure framework. The table may also define fields 1802, 1804, 1806, 1808, 1810 for each of the entries. The fields 1802, 1804, 1806, 1808, 1810 may, according to some embodiments, specify: a homeowner identifier 1802, a policy identifier 1804, a persona 1806, optional coverages 1808, and an overall premium 1810. The risk relationship package database 1800 may be created and updated, for example, based on information electrically received from various computer systems, including those associated with homeowners.

The homeowner identifier 1802 may be, for example, a unique alphanumeric code identifying a customer (or potential customer) of an insurance provider. The policy identifier 1804 may identify an existing insurance policy or package (or potential new insurance policy or package that is being generated for the customer). The persona 1806 may describe the customer based on answers to questions, demographic information, etc. and may provide some indication as to a protection level or optional coverages that might be appropriate for the customer. The optional coverages 1808 may comprise identifiers indicating potential insurance coverages for the customer or coverages that have been actually selected by the customer. The overall premium 1810 might be a calculated value for the policy identifier 1804 based on any of the algorithms or calculations described herein (e.g., as described in connection with FIG. 8).

Thus, embodiments may provide systems and methods to automatically establish a risk relationship package using a flexible structure framework in a way that provides fast and accurate results. Embodiments may also provide an ability to access and interpret data in a holistic, tactical fashion. According to some embodiments, the system may be agnostic regarding particular web browsers, sources of information, etc. For example, information from multiple sources (e.g., an internal insurance policy database and an external data store) might be blended and combined (with respect to reading and/or writing operations) so as to appear as a single "pool" of information to a user at a remote device. Moreover, embodiments may be implemented with a modular, flexible approach such that deployment of a new system for an enterprise might be possible relatively quickly.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
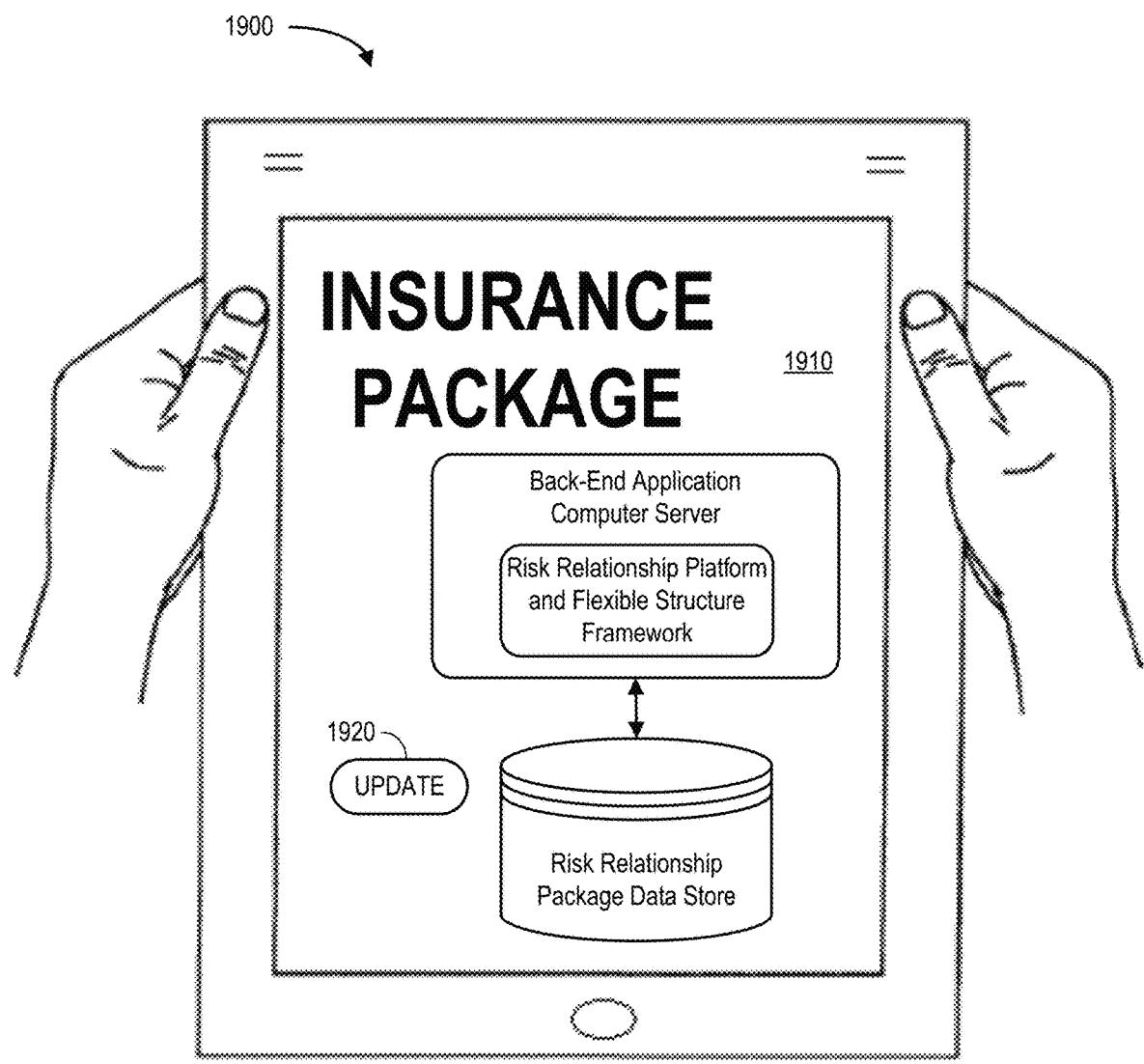
FIG. 19 illustrates a tablet computer displaying an insurance package display according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in addition to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 19 illustrates a handheld tablet computer 1900 showing an insurance package display 1910 according to some embodiments. The insurance package display 1910 might include user-selectable data that can be selected and/or modified by a user of the handheld computer 1900 (e.g., via an "Update" icon 1920) to view updated insurance information associated with an entity and/or enterprise (e.g., including, in some embodiments, an overall insurance premium value).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A risk relationship package creation system implemented via a back-end application computer server, comprising:
    (a) a risk relationship package data store associated with an encrypted database management system and that contains electronic records, each electronic record representing a risk relationship package between an enterprise and an entity, and including, for each risk relationship package, an electronic record identifier and an overall attribute value;
    (b) an available type of risk coverage data store associated with the enterprise;
    (c) the back-end application computer server, coupled to the risk relationship package data store and the available type of risk coverage data store, including:
        a computer processor, and
        a computer memory, coupled to the computer processor, storing instructions that, when executed by the computer processor, cause the back-end application computer server to:
        (i) transmit, to a remote device associated with the entity, a set of potential types of risk coverage based on information in the available type of risk coverage data store,
        (ii) receive, from the remote device, an indication of a selected subset of the potential types of risk coverage,
        (iii) based on the received indication and a pre-determined rule, generate a risk relationship package for the entity using a flexible structure framework,
        (iv) calculate an overall attribute value for the generated risk relationship package based on an attribute algorithm such that at least one reduction to the overall attribute value is applied based on an amount associated with the selected subset, and
        (v) create a new electronic record in the risk relationship package data store, including the calculated overall attribute value; and
    (d) a communication port coupled to the back-end application computer server to facilitate a transmission of data to the remote device to support an interactive display, including an indication of the calculated overall attribute value, via security features and a distributed communication network.

2. The system of claim 1, wherein the generated risk relationship package includes pre-grouped types of risk coverage in addition to the selected subset of the potential types of risk coverage received from the user device.

3. The system of claim 2, wherein the pre-grouped types of risk coverage are associated with at least three coverage tiers.

4. The system of claim 3, wherein the back-end application computer server automatically suggests one of the coverage tiers for the entity.

5. The system of claim 4, wherein said automatic suggestion of one of the coverage tiers is based at least in part answers provided by the entity to a series of questions.

6. The system of claim 1, wherein the generated risk relationship package is associated with a homeowner's insurance policy.

7. The system of claim 6, wherein the calculated overall attribute value is an insurance premium value.

8. The system of claim 7, wherein the set of potential types of risk coverage include at least one of: (i) a fire department service charge, (ii) lock replacement, (iii) water sewer backup, (iv) equipment breakdown, (v) roof damage, (vi) weather damage, (vii) property damage, and (viii) personal injury.

9. The system of claim 7, wherein the attribute algorithm applies at least one of: (i) a flat package discount, (ii) a package volume discount, (iii) a package volume discount with an eligibility component, and (iv) a package discount at coverage level.

10. A computerized risk relationship package creation method implemented via a back-end application computer server, comprising:
    accessing, by the back-end application computer server, a risk relationship package data store associated with an encrypted database management system and that contains electronic records, each electronic record representing a risk relationship package between an enterprise and an entity, and including, for each risk relationship package, an electronic record identifier and an overall attribute value;
    transmitting, from a computer processor of the back-end application computer server to a remote device associated with the entity, a set of potential types of risk coverage based on information in an available type of risk coverage data store;
    receiving, from the remote device, an indication of a selected subset of the potential types of risk coverage;
    based on the received indication and a pre-determined rule, generating a risk relationship package for the entity using a flexible structure framework;
    calculating an overall attribute value for the generated risk relationship package based on an attribute algorithm such that at least one reduction to the overall attribute value is applied based on an amount associated with the selected subset;
    creating a new electronic record in the risk relationship package data store, including the calculated overall attribute value; and
    transmitting data, through a communication port coupled to the back-end application computer server to the remote device, supporting an interactive display, including an indication of the calculated overall attribute value, via security features and a distributed communication network.

11. The method of claim 10, wherein the generated risk relationship package includes pre-grouped types of risk coverage in addition to the selected subset of the potential types of risk coverage received from the user device.

12. The method of claim 11, wherein the pre-grouped types of risk coverage are associated with at least three coverage tiers.

13. The method of claim 12, wherein the back-end application computer server automatically suggests one of the coverage tiers for the entity.

14. The method of claim 13, wherein said automatic suggestion of one of the coverage tiers is based at least in part answers provided by the entity to a series of questions.

15. A non-transitory, computer-readable medium storing instructions, that, when executed by a processor, cause the processor to perform a risk relationship package creation method implemented via a back-end application computer server, the method comprising:

accessing, by the back-end application computer server, a risk relationship package data store associated with an encrypted database management system and that contains electronic records, each electronic record representing a risk relationship package between an enterprise and an entity, and including, for each risk relationship package, an electronic record identifier and an overall attribute value;

transmitting, from a computer processor of the back-end application computer server to a remote device associated with the entity, a set of potential types of risk coverage based on information in an available type of risk coverage data store;

receiving, from the remote device, an indication of a selected subset of the potential types of risk coverage;

based on the received indication and a pre-determined rule, generating a risk relationship package for the entity using a flexible structure framework;

calculating an overall attribute value for the generated risk relationship package based on an attribute algorithm such that at least one reduction to the overall attribute value is applied based on an amount associated with the selected subset;

creating a new electronic record in the risk relationship package data store, including the calculated overall attribute value; and transmitting data, through a communication port coupled to the back-end application computer server to the remote device, supporting an interactive display, including an indication of the calculated overall attribute value, via security features and a distributed communication network.

16. The medium of claim 15, wherein the generated risk relationship package is associated with a homeowner's insurance policy.

17. The medium of claim 16, wherein the calculated overall attribute value is an insurance premium value.

18. The medium of claim 17, wherein the set of potential types of risk coverage include at least one of: (i) a fire department service charge, (ii) lock replacement, (iii) water sewer backup, (iv) equipment breakdown, (v) roof damage, (vi) weather damage, (vii) property damage, and (viii) personal injury.

19. The medium of claim 17, wherein the attribute algorithm applies at least one of: (i) a flat package discount, (ii) a package volume discount, (iii) a package volume discount with an eligibility component, and (iv) a package discount at coverage level.

* * * * *